May 1, 1951  J. W. SPEER  2,551,066
SHIP MOUNTED CRANE
Filed July 3, 1947  8 Sheets-Sheet 1

INVENTOR.
JAMES W. SPEER

BY
John W. Michael
ATTORNEY.

May 1, 1951 J. W. SPEER 2,551,066
SHIP MOUNTED CRANE
Filed July 3, 1947 8 Sheets-Sheet 2
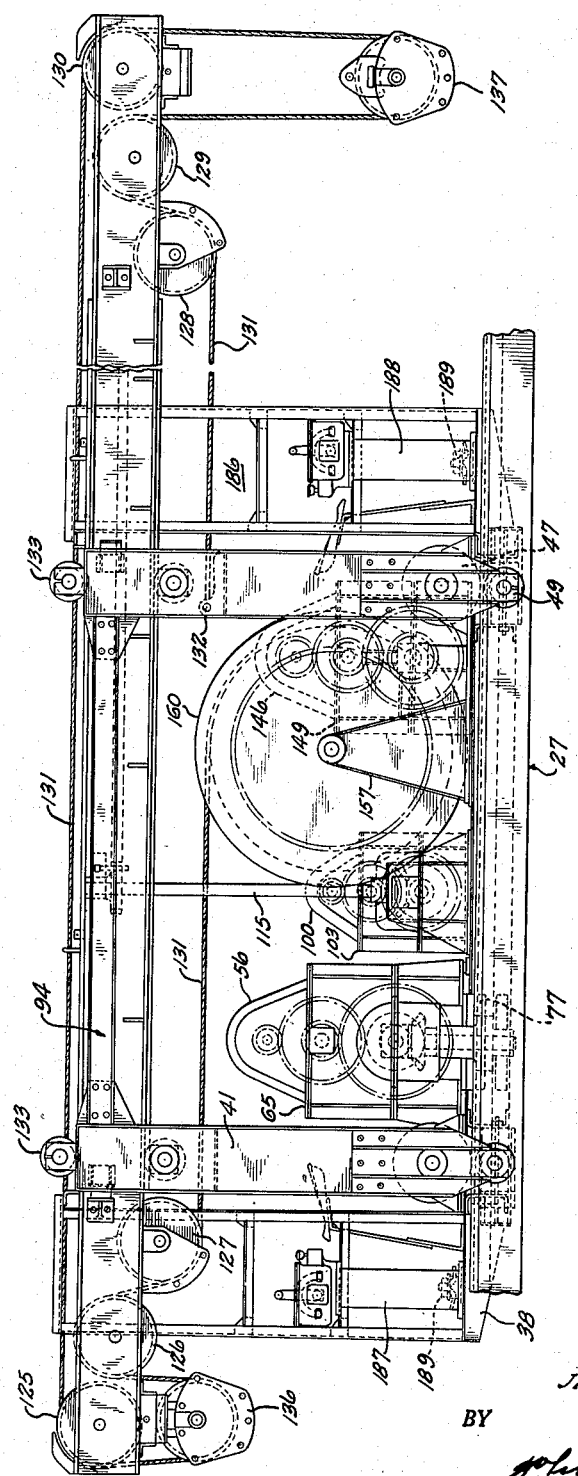
INVENTOR.
JAMES W. SPEER
BY
John W. Michael
ATTORNEY.

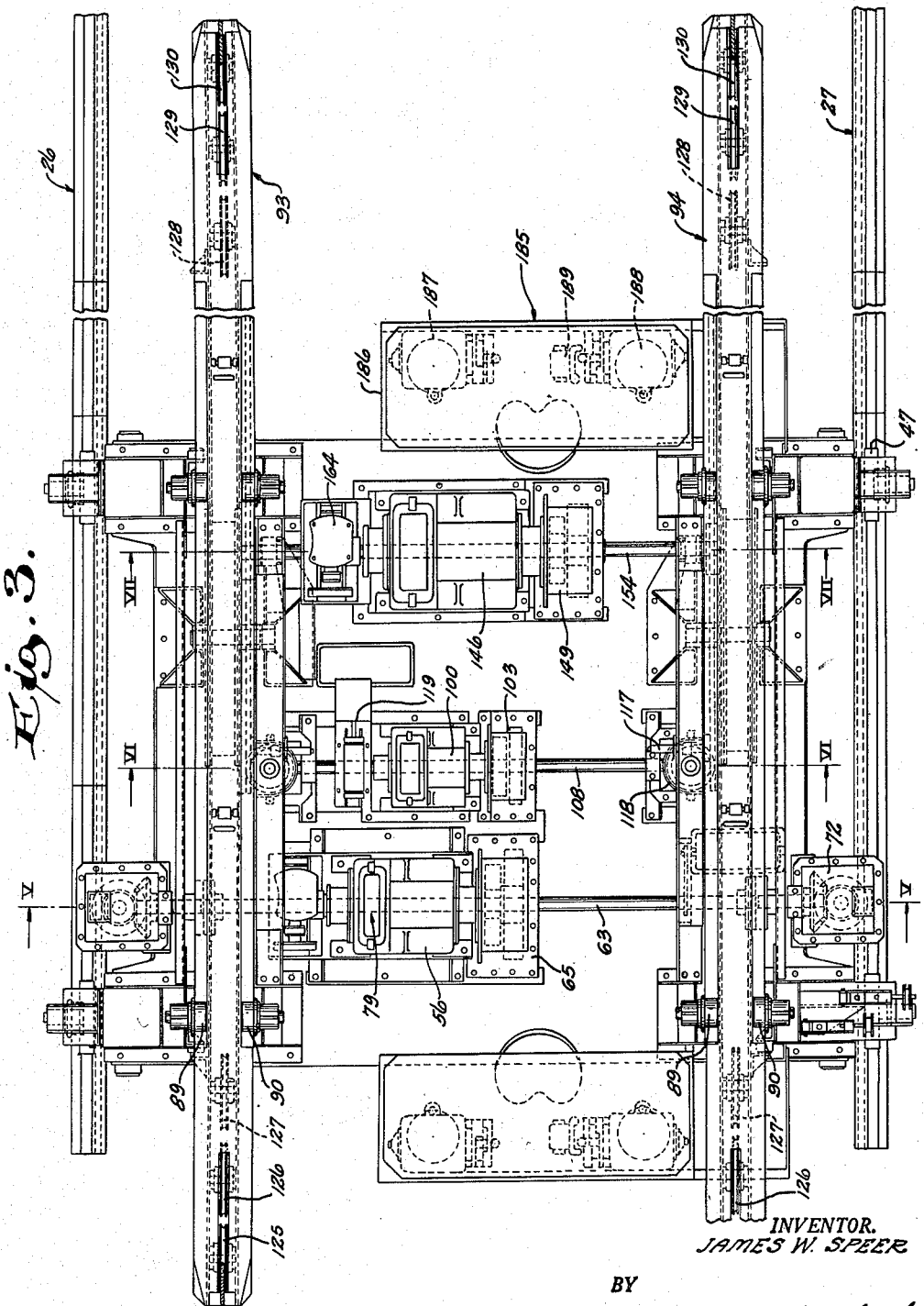

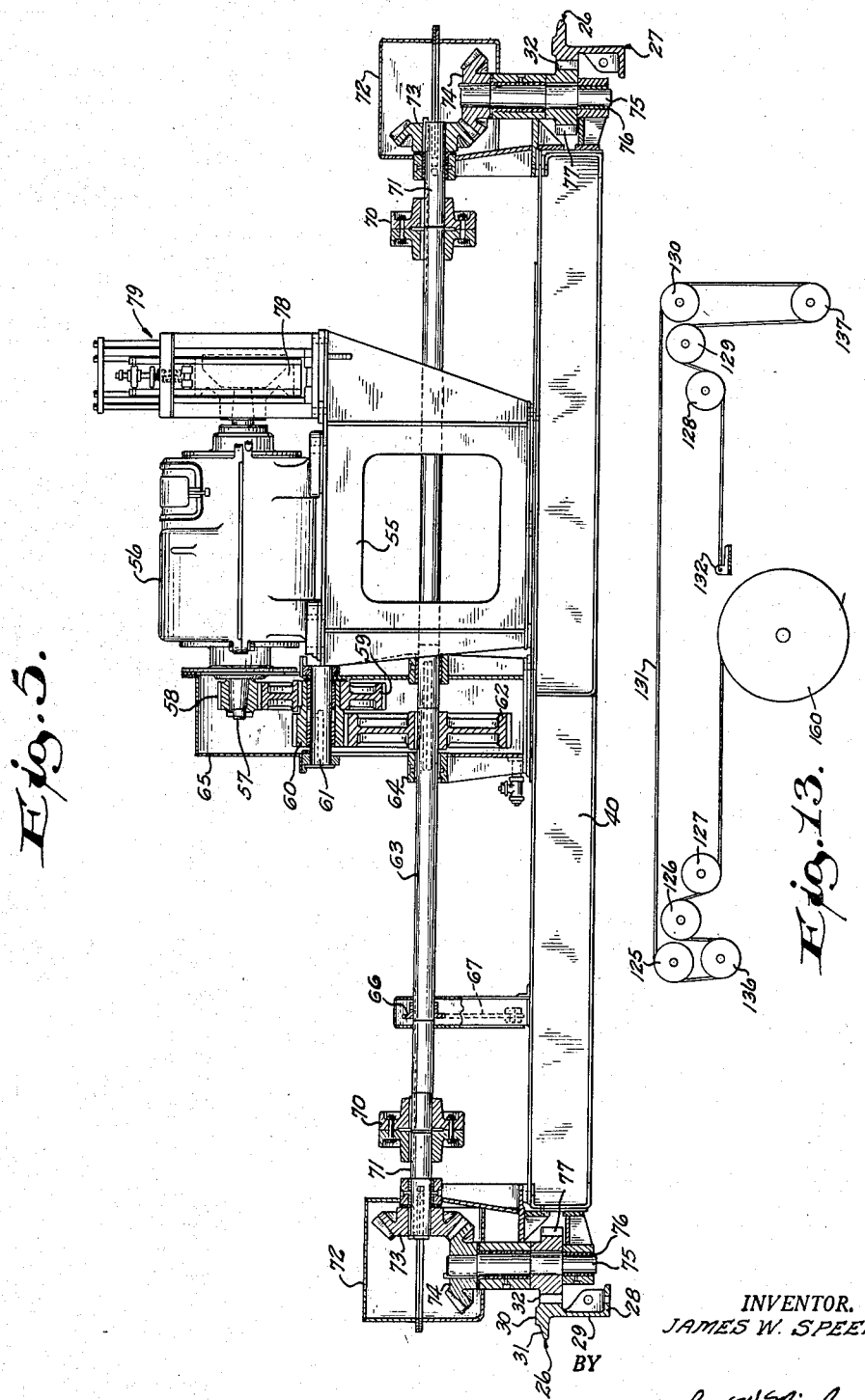

May 1, 1951 J. W. SPEER 2,551,066
SHIP MOUNTED CRANE
Filed July 3, 1947 8 Sheets-Sheet 6
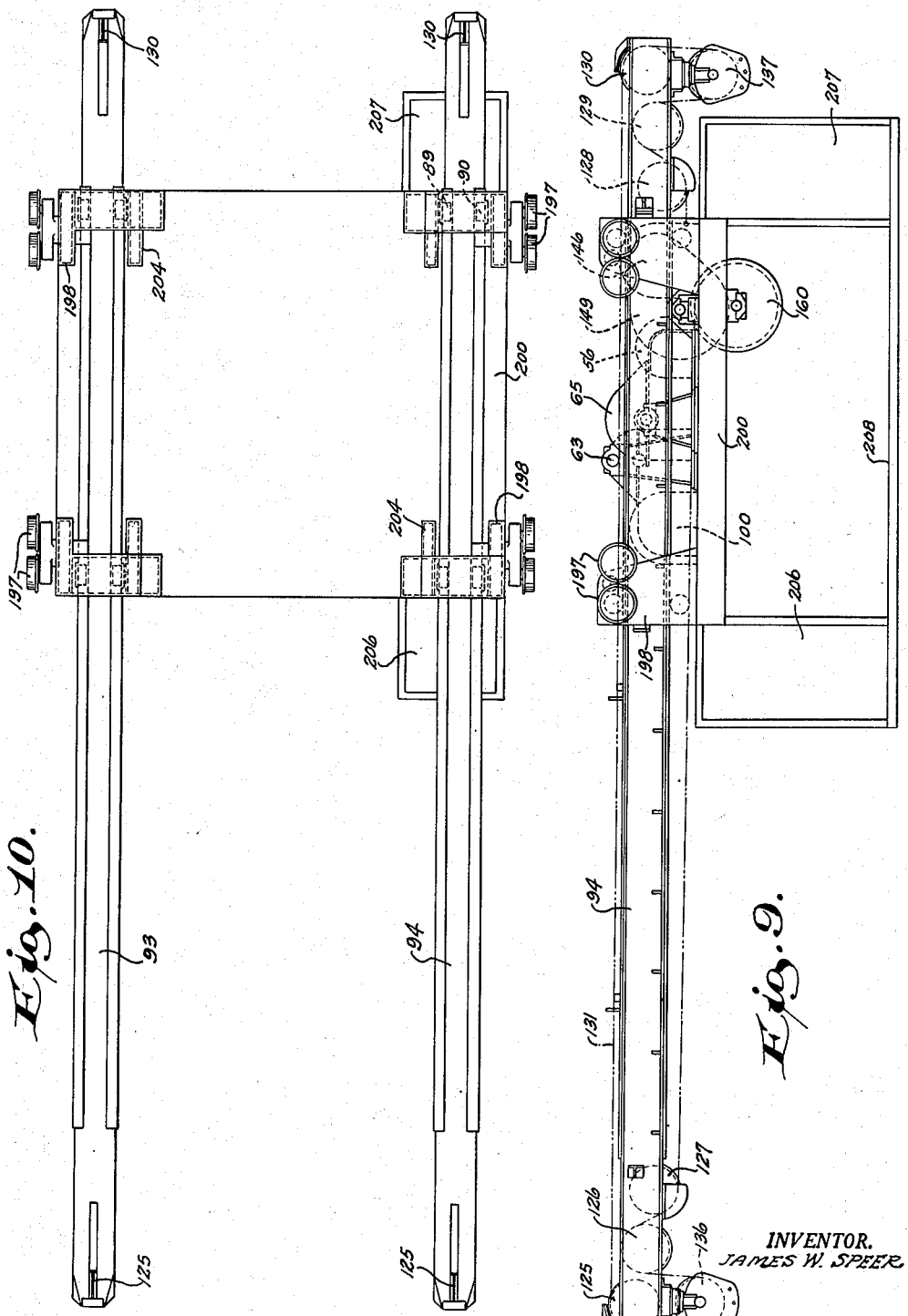
INVENTOR.
JAMES W. SPEER
BY John W. Michael
ATTORNEY.

May 1, 1951 J. W. SPEER 2,551,066
SHIP MOUNTED CRANE
Filed July 3, 1947 8 Sheets-Sheet 7

INVENTOR.
JAMES W. SPEER
BY
John W. Michael
ATTORNEY.

May 1, 1951 J. W. SPEER 2,551,066
SHIP MOUNTED CRANE
Filed July 3, 1947 8 Sheets-Sheet 8
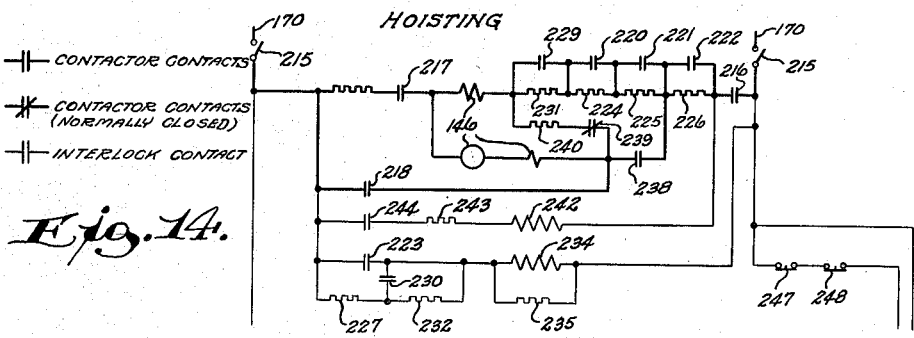
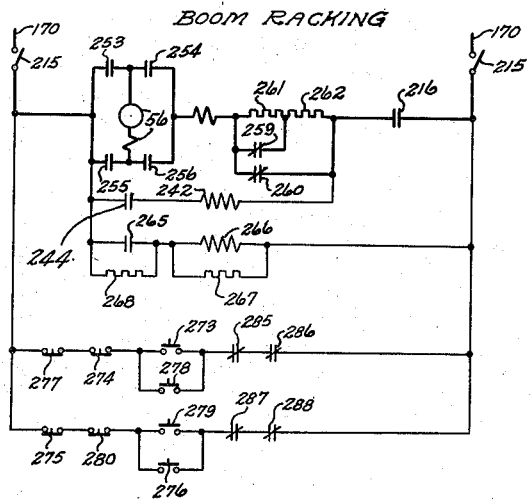
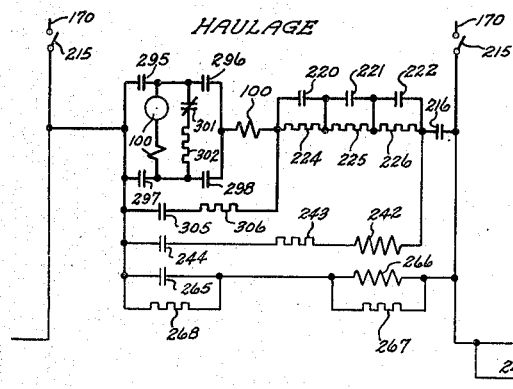
INVENTOR.
JAMES W. SPEER
BY
John W. Michael
ATTORNEY.

Patented May 1, 1951

2,551,066

UNITED STATES PATENT OFFICE 2,551,066

SHIP MOUNTED CRANE

James W. Speer, Easton, Md., assignor to Lake Shore Engineering Company, Iron Mountain, Mich., a corporation of Michigan Application July 3, 1947, Serial No. 758,881

12 Claims. (Cl. 214—15)

This invention relates to improvements in cranes mounted on shipboard for loading and unloading ship's cargo and particularly to a crane structure wholly contained within a ship.

It is one object of the invention to provide a crane which will be wholly contained within a ship and which may be extended from either side thereof for loading and unloading cargo.

Another object of the invention is to provide a ship's cargo crane controllable by a single operator for loading and unloading cargo or shifting cargo between the decks of a ship and in which all operations of the crane may be under direct observation of the crane operator.

Another object of the invention is to provide a ship's cargo handling crane on board ship and which can be maintained while the ship is out of port and can be used for handling cargo immediately upon entry of the ship into a port.

A further object of the invention is to provide a gantry or trolley type of crane movable as a whole between adjacent ports in a ship's sides and over hatches in the ship's decks, in which a boom is extensible beyond and retractible into the ship and in which loads may be hoisted and lowered from or within a ship, all under the direct observation of the crane operator.

A further object of the invention is to provide a gantry or trolley type crane movable within a ship's hull and controllable from either of two duplicate control stations on the crane, in which the control stations are so interconnected and interlocked with each other that energization of the several motors of the crane is possible only when all of the crane elements and the ports are in the proper operating positions.

And a further object of the invention is to provide an electrically or hydraulically operated gantry or trolley type crane mounted in a ship's hull and capable of traveling as a whole athwart the ship, the crane having a boom extensible from and retractible into a ship through ports in the sides thereof and having means for hoisting and lowering loads outside of and within the ship, the several movements of the crane and of the various parts thereof being so interrelated and limited responsive to the crane movements as to prevent faulty operations thereof.

Objects and advantages other than those above set forth, will be apparent from the following description when read in connection with the accompanying drawing, in which:

Fig. 2 is a side elevation of the structure of the present invention together with a portion of the structure to be fixed on the ship;

Fig. 3 is a top plan view of Fig. 2;

Fig. 5 is a partial cross sectional view on the vertical plane of line V—V of Fig. 3 to show one of the crane drives;

Fig. 9 is a somewhat diagrammatic side elevational view of a modified form of the invention;

Fig. 10 is a somewhat diagrammatic top plan view of Fig. 9, omitting the several drives therefrom;

Fig. 13 is a diagram illustrating the reeving of the load hoisting cables on the crane;

Fig. 14 is an elementary diagram of the circuits for the load hoisting motor and its control, together with a table identifying the special symbols used in the diagrams;

Fig. 15 is a diagram similar to Fig. 14 of the circuits of the motor for racking the boom to and fro relative to the crane frame, and Fig. 16 is a diagram similar to Fig. 14 of the circuits for the motor for hauling or moving the crane as a whole in the passageway athwart the ship.

Figure 1:
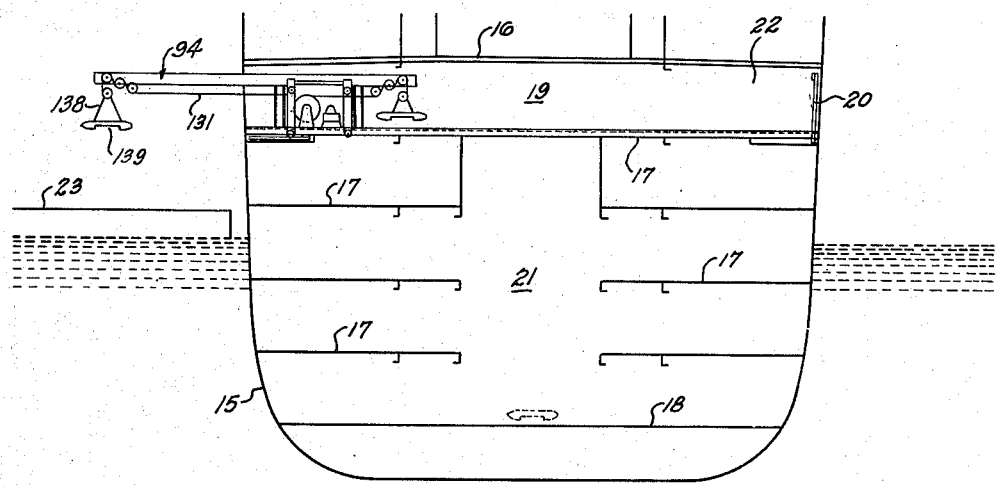
Fig. 1 is a diagrammatic view showing the application of the present invention to a ship and in position for loading or unloading cargo from or on a dock or lighter.
Figure 4:
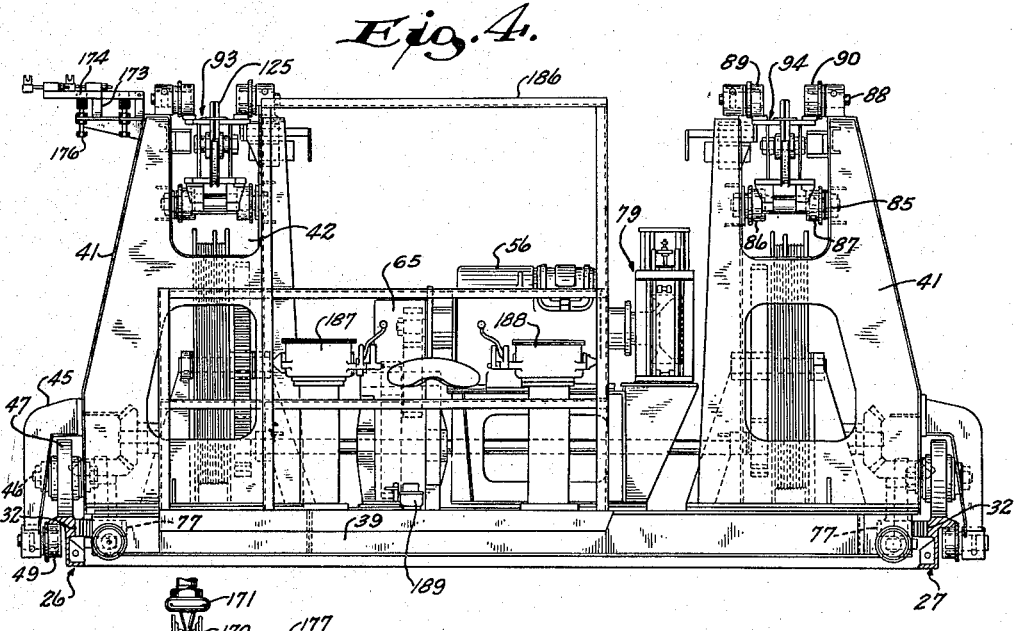
Fig. 4 is an end elevation of the structure of the present invention, omitting the boom cables and the elements supported on such cables.

Generally, the present device is to be mounted in an athwart or transverse passage in a ship below a deck thereof and with ports in the ship's sides at both ends of the passage, there being no need for openings into the passage through the top deck. A pair of rails is fixed in the passage to support a movable cargo handling crane resting thereon or suspended therefrom. The rails are formed with flanges for retaining the crane against movements transverse to the rails and are formed with rack teeth by which the crane is moved along the passage. The crane includes a frame composed of a base and pillar members mounted on the base and is provided with wheels supporting and retaining the frame on the rails. A boom comprising a plurality of boom members, is mounted on the frame pillars for reciprocation relative thereto and may be extended from either end of the frame and through the ship's ports for considerable distances beyond the sides of the ship.

Power driven means are mounted on the frame for engagement with the rail racks for moving the entire crane structure along the rails. Power driven means are also mounted on the crane frame to reciprocate the boom relative to the frame whether or not a load is being carried on the boom. A number of sheaves are mounted on the boom to receive cables which severally carry pulley blocks at the ends of the boom for mounting thereon the means for carrying loads to be hoisted and lowered by winding up and paying out the cables. Such movement of the cables is produced by a single power driven means mounted on the frame. The several power driven means are co-related to permit independent or simultaneous energization thereof as desired and from either end of the frame and are preferably electric and reversible motors receiving power from electric conductors on which a current collector runs. Control means are provided to prevent faulty operation of the motors either by energization at the wrong time or for too long a time, particularly when the ports are closed.

Referring particularly to the drawings, reference numeral 15 indicates the hull of a ship with a top deck 16, a plurality of intermediate decks 17 and a bottom deck 18. A passageway 19 is provided athwart the hull and preferably immediately below the top deck with suitable ports 20 for closing the ends of the passageway through the hull and which may be opened or closed by electric means as is well known. The top deck preferably has no opening therethrough into the passage but the spaces between the several intermediate decks and over the bottom deck are accessible by way of hatches 21, preferably below the central portion of the passage, for moving cargo into and out of such spaces. It is well known that ship's hulls are usually divided athwart ship by a number of bulkheads, one of which is indicated at 22, and which divide the hull into a number of compartments which may be made water tight. Hence, the hull structure indicated above is repeated a number of times in the length of the ship and the crane structure to be described is repeated in each such compartment. The numeral 23 indicates a pier or lighter on or into which cargo may be discharged from the ship or from which cargo may be taken into the ship by the crane.

In the first embodiment of the invention to be described, a pair of rails generally designated 26 and 27 are fixed in parallel relation on the deck 17 of the passageway 19 and extend substantially throughout the length of such passageway and adjacent the bulkheads 22 of the passage. The rails are similar and (see particularly Fig. 5) comprise a foot 28, a web 29 and a head having an upper plane surface 30, the head having a flange 31 extending from one side thereof to provide a plane surface also on the underside of such flange. The side of the head opposite the flange 31 is toothed as shown at 32 to form a rack along the rails which are so placed in the passage 19 that the flanges 31 extend toward the bulkheads 22 while the racks 32 face each other across the passage. The rails support and retain the cargo handling crane of the present invention, in a predetermined path of movement in the passage and provide surfaces engageable by means mounted on the crane for positively positioning and retaining the crane in any desired position in the passage.

The crane includes a frame of suitable side and end members 38 and 39 with cross braces 40, all joined to provide a rectangular base on which is mounted a suitable floor. Similar pillars 41 are mounted adjacent each of the four corners of the base and extend upwardly from the base when the crane structure is mounted in the ship, thus substantially defining a rectangular space which may be physically divided, if desired, into a number of spaces to enclose the various power drives of the crane and the control for such drives. It is preferable that notches 42 be formed in the upper end of such pillars. Brackets 45 are fixed on each of the several pillars 41 and extend in spaced relation therefrom to coact with the pillars, in severally receiving axles 46 extending across the space between a pillar and its bracket to receive a wheel 47 mounted on antifriction bearings and adapted to roll on the upper surface 30 of one of the rails, to support the entire crane structure for movement along the rails. An end of each of the brackets extends over and below the flange 31 of the adjacent rail to receive a pin on which is mounted a roller 49, on antifriction bearings, to extend under the flange and provide means for holding the crane structure on the rails and against movement transverse thereto regardless of the rolling or pitching of the ship.

The entire crane is positively moved on the rails and held in any desired position thereon by a single power drive engaging the racks on both rails. A pedestal 55 (see Fig. 5) is mounted on the frame to receive an electric motor 56 with a shaft 57 extending at right angles to the rails and beyond both ends of the motor frame. The motor is of the direct current reversible type to provide power for movement of the crane frame in either direction on the rails. A gear 58 is fixed on one end of the motor shaft to drive a speed reducing gearing which includes gears 59 and 60 on the same shaft 61, the gear 60 meshing with a gear 62 mounted on a cross shaft 63 supported in bearings 64 in a casing 65 containing lubricant for the gearing. The cross shaft extends parallel to the motor shaft and adjacent to the sides of the crane frame. A sprocket 66 is mounted on the cross shaft to drive a chain 67 for actuating a suitable known limit switch, responsive to the amount of rotation of the cross shaft, thus preventing crane movement beyond given limits adjacent the ends of the passageway. The ends of the cross shaft 63 are severally joined by couplings 70 with shafts 71 journaled in housing 72 and severally bear bevel gears 73. The bevel gears 73 severally mesh with second bevel gears 74 on shafts 75 extending from the housings 72 between a rail and a side member of the crane frame and the shafts 75 are supported on such frame by bearings 76. A pinion 77 on shaft 75 meshes with one rail rack 32, the above beveled gear and drive pinion construction being duplicated on each end of shaft 71 to act on each rail at opposite points, to move the crane as a whole along the rails. The motor shaft 57 has fixed on one end thereof a drum 78 which is engageable by the band of a magnetically operable brake generally indicated as 79, and of any one of several well known types.

The notches 42 in the upper ends of the several crane frame pillars 41 have severally mounted therein and thereon several pairs of rollers in spaced relation to each other and with the several rollers of each pair spaced from each other by a given distance. An axle 85 is fixed in a pillar to extend across the notch thereof for supporting flanged rollers 86 and 87, preferably on antifriction bearings, with the flanges at the outer ends of the pair of rollers. A pair of pins 88 are mounted on the upper ends of the pillar to support aligned rollers 89 and 90 which are also flanged and spaced from each other at the same distance as the rollers 86, 87, the latter flanges also defining the length of the space between the two rollers.

Figure 6:
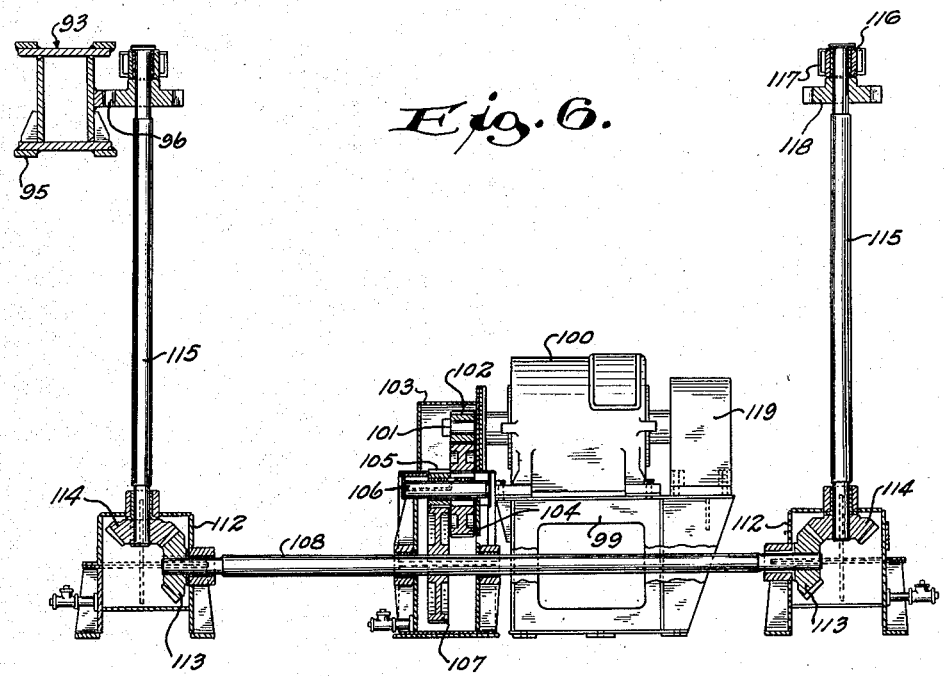
Fig. 6 is a partial cross sectional view on the vertical plane of line VI—VI of Fig. 3 but showing one of the crane drives only.

The peripheral surfaces of the several pairs of rollers and the inner surfaces of their flanges define substantially rectangular spaces along the sides of the crane frame in which are mounted, for reciprocation relative to the crane frame, separate members 93 and 94 forming a boom. The boom members (see Fig. 6) are of generally rectangular section with flanges extending therefrom to receive bars 95 engageable with the peripheral surfaces of the rollers. Each of the boom members has mounted, on facing surfaces when the boom members are in place on the crane frame, a rack bar 96 to be engaged by means for reciprocating the several boom members (simultaneously and by the same amount), relative to the crane frame. A pedestal 99 (see Fig. 6) is mounted on the crane base to receive an electrical motor 100 having a shaft 101 extending perpendicular to the boom members and beyond both ends of the motor frame. The motor is of the direct current reversible type to permit ready rotation of the motor in either direction. A gear 102 is mounted on one end of the motor shaft to drive a speed reducing gearing in a casing 103, the gearing comprising gears 104 and 105 on a shaft 106 with the gear 105 engageable with a gear 107 mounted on a cross shaft 108 extending parallel with the motor shaft towards the sides of the crane base to substantially below the several boom racks 96. The cross shaft ends severally extend into casings 112 and are journaled therein to support bevel gears 113. The gears 113 severally mesh with second bevel gears 114 fixed on shafts 115 supported at the lower end in the casings 112 and having the upper ends supported in bearings 116 in cross braces 117 extending between the crane pillars along the sides of the base. Pinions 118 are severally mounted on the shafts 115 to engage with the rack bars 96 on the boom members for reciprocating the boom 93, 94 relative to the crane frame to move both boom members simultaneously and by the same amount. The motor shaft 101 is provided with a magnetic brake indicated at 119, such brake being any one of the well known forms and therefore not further described.

The boom members have severally mounted therein a plurality of sheaves (see Figs. 2 and 3) numbered 125–130 to receive a cable 131 anchored at one end at 132 and running on rollers 133 on the top of the boom member. The cable portions between the sheaves 125–126 and 129–130 form loops with pulleys 136 and 137 mounted thereon to receive slings 138 (see Fig. 1) from which are suspended pallets 139 or other means for carrying loads. The boom members being of the same length and the sheaves thereof being of the same size and placed in similar positions and the several pulleys being similar, when cables of the same size are used, the pulleys 136 and 137 which act in pairs at corresponding ends of the boom members, will be raised and lowered by the same amount as the cables are wound up and payed out by similar means.

Figure 7:
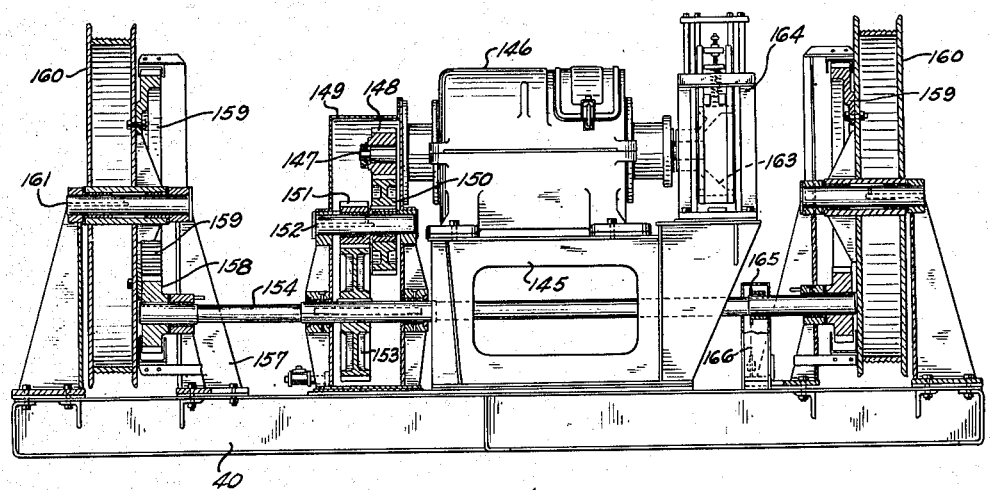
Fig. 7 is a partial cross sectional view on the vertical plane of line VII—VII of Fig. 3 to show another of the crane drives.
Figure 12:
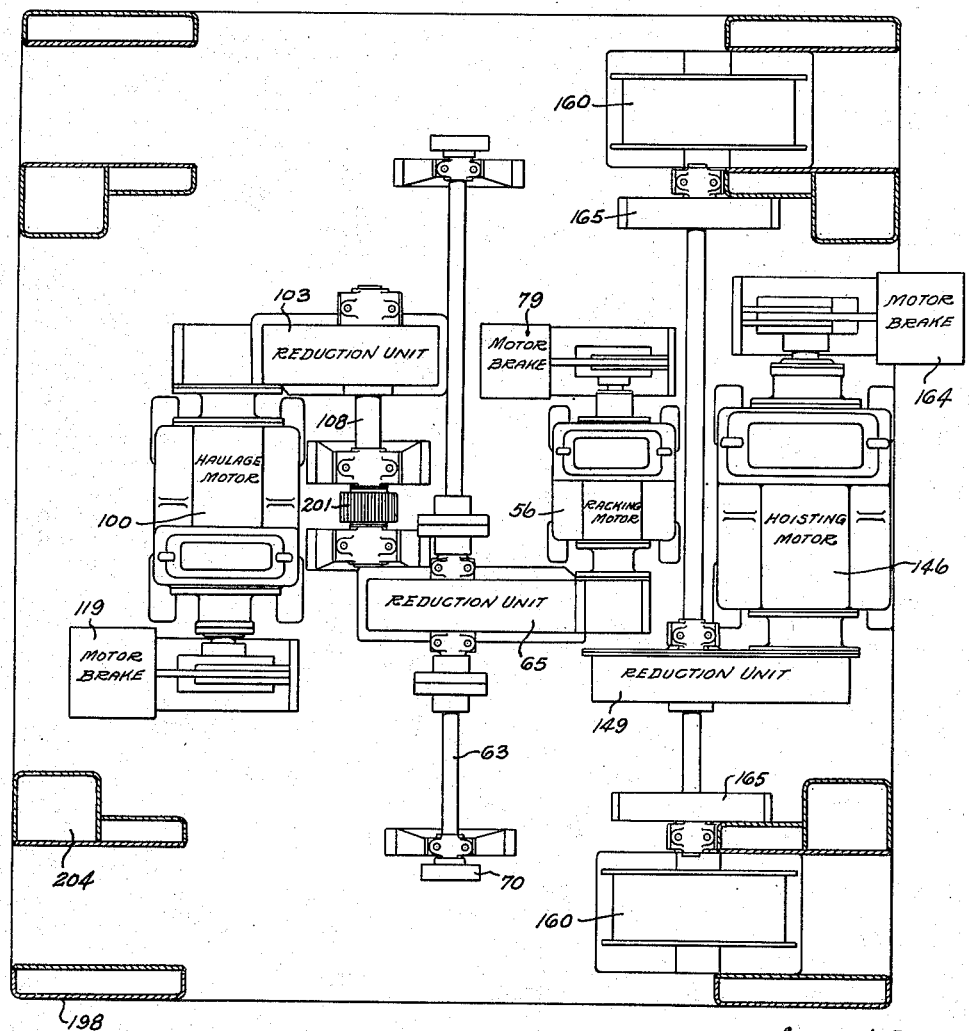
Fig. 12 is a view partially in section and partially in top plan to show the relations of the various parts of the several drives.

The means for winding up and paying out the cables is shown in Fig. 7 as comprising a pedestal 145 mounted on the crane base to receive an electric motor 146 with a shaft 147 extending beyond both ends of the motor frame. One end of the shaft 147 bears a gear 148 driving speed reduction gearing in a casing 149 and comprising gears 150 and 151 mounted on the same shaft 152 with the gear 151 meshing with a gear 153 on a cross shaft 154. The cross shaft 154, parallel to the motor shaft, is mounted in bearings in pedestals 157. A gear 158 on each end of shaft 154 meshes with a gear 159 mounted on the drum 160 which is rotatable on shaft 161 in pedestal 157. Each of the two drums serves to wind up and pay out one of the cables 131 and, being driven by the same means, moves such cables simultaneously and by the same amount. Hence, one or the other of the pairs of pulleys 136 or 137 may be raised and lowered simultaneously and by the same amount. One end of the motor shaft 147 has mounted thereon a brake drum 163 on which an electrically operated brake 164 acts, the brake being of one of the well known types and therefore not further described. The crossshaft 154 has mounted thereon a sprocket 165 driving a chain 166 for operating a known type of limit switch in the circuit of motor 146, responsive to the total allowable rotation of such shaft in either direction and hence controlling the amount of movement of the cables.

Figure 8:
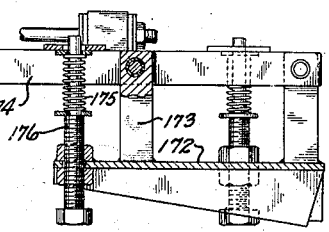
Fig. 8 is an enlarged view, partially in section, of the means for collecting electric current from trolley wires for the motors of the crane.

Current is supplied to the various motors from a suitable source by way of a pair of conductors 170 on insulators 171, (see Fig. 8) and is collected from such conductors by a pair of similar means mounted on a bracket 172 extending from one or more of the frame pillars adjacent the conductors. The current collecting means severally include a post 173 on which is pivoted a lever 174 urged upwardly about its pivot by a spring 175 on a screw 176 adjustable to limit upward movement of the lever. A block of insulating material 177 is fixed on the end of the lever 174 and an arm 178 is mounted in such insulation for limited pivoting relative thereto. A shoe 179 is fixed on the end of the arm 178 and slides in contact with one of the conductors 170. The several current collecting means are duplicates and need not be further described. Current is taken from the arm 178 to the various electric motors and their controls, diagrammatically shown in Figs. 14, 15 and 16.

Duplicate control stations and controls are provided at each end of the crane frame as indicated at 185 (see Figs. 2 and 3). Each control station may be at least partially enclosed as indicated at 186 and includes a plurality of controllers 187 and 188 connected with and controlling motors 56 and 146 respectively while motor 100 is controlled by a foot operated switch indicated at 189 and of the "start-stop-reverse" type. The controllers and the control switch are of well known construction and are not disclosed in detail. The limit switches interrupt the motor circuits and energize the brakes as is well known to prevent further movement of the motors controlled thereby regardless of continued completion of the circuits to such motors through the controllers and the foot switch.

The structure of Figs. 9, 10, 11 and 12 differs generally from the structure of the first embodiment of the invention in suspension of the rails from the top deck, in providing a crane frame with pillars of only sufficient height to receive the boom members thus raising the frame base a considerable distance above the deck of the passageway, and in suspending the control stations from the base for better observation of crane operation by the crane operator. Similar structures in the two modifications are designated by the same reference numerals.

In the present modification, hangers 195 receive rails 196 which are formed as channels. Pairs of wheels 197 are mounted on equalizing supports extending from pillars 198 on the corner of the frame base comprising end and of side members 199 and 200 respectively. The wheels 197 are of such size as to fit clearly into the channels with the wheel flanges bearing on the edges of the channel flanges.

Other pillars 204 are mounted on the base in spaced relation to the pillars 198 to provide supports for pairs of rollers 86, 87 and 89, 90 on which the boom members 93, 94 move as was previously described. It will be understood that the pillars 198 and 204 are suitably interconnected to form rigid structures of adequate strength to carry the boom members. The structure of the boom members themselves is similar to that above described and such members are similarly equipped with sheaves and cables to actuate the pairs of pulleys 136, 137.

Figure 11:
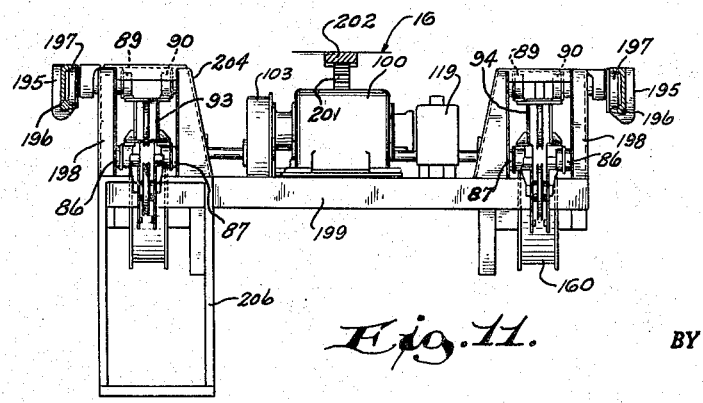
Fig. 11 is an end elevation of the modified form of the invention with parts thereof omitted for the sake of clarity in illustration.

The drive for moving the present crane structure as a whole through the passageway is similar to the drive shown in Fig. 5 excepting that a pinion 201 on shaft 108 engages with a rack 202 on the underside of deck 16 as indicated in Fig. 11, and extending athwartship. The drive for moving the boom 93, 94 relative to the frame is similar to the drive shown in Fig. 6, while the drive for winding and paying out the cables is similar to the drive shown in Fig. 7. Such drives are designated respectively the haulage racking and hoist drives in both embodiments of the invention. The control stations are now formed as cabs 206, 207 suspended from the frame and extend beyond the frame as shown in Fig. 9, the several cabs being interconnected by bracing members 208. It will be seen that the cabs are forward of the frame so that the operator will be adjacent to or outside of the hull ports of the ship while the crane frame is still a slight distance from the ports. The operator, therefore, has a much clearer view of the loading operations on the dock or lighter and can actually be over the hatch when lowering the load, thereby providing much better supervision of crane operations than heretofore. The cable drums are also more clearly in the view of the operator so that speed of hoisting can be as rapid as the cable will wind properly on the drums. Another advantage of this modification is that the deck is free of obstructions.

Referring now to the electrical diagrams shown in Figs. 14, 15 and 16, the two conductors of the supply line are designated at 170 and each of such conductors is connectible or disconnectible from the crane by way of line switches 215. All of the motors are of the direct current type with series, commutating and shunt fields and, in at least two of the drives, are provided with both dynamic and friction braking. The motor control circuits are simple and similar and most of the control contacts are included in a drum type of controller. The circuits are provided with emergency stop switches and suitable limit switches are embodied in such circuits together with various types of relays such as are well known for protecting electric circuits against over-loads, under-voltage, etc.

The circuits for the hoisting motor 146 as shown in Fig. 14 include a controller having a line closing contact 216 and contacts 217 and 218 respectively for lowering and hoisting loads. Acceleration of the motor is controlled by contactors 220–223 inclusive, in parallel with resistors 224–227 inclusive, as is well known and by field weakening contactors 229 and 230 controlling the connection of resistors 231 and 232. The shunt field of the motor is designated at 234, is in parallel with resistor 235 and is controlled by contactor 230. The dynamic braking circuit includes contactors 238 and 239 controlling the connection of resistor 240 in parallel with the accelerating contactors as is well known. The brake 164 has a winding 242 in series with a resistor 243 and is controlled by contactor 244. Emergency stop switches 247 and 248 are provided at the starboard and port control stations or cabs respectively for interrupting the motor circuit whenever desired.

The circuit for the boom racking motor 56 is shown in Fig. 15 and is generally similar to the circuit above described. The armature of the motor 56 and its commutating field are connected across a parallel circuit of which the branches severally contain contactors 253, 254 and 255, 256 controlling the connections of the motor for boom operation forward and reverse toward port and starboard respectively from the crane frame. Acceleration of the motor 56 is controlled by contacts 259, 260, controlling the connection of resistors 261, 262 respectively with the motor series field. The racking motor does not have dynamic braking and has limit switches controlling the extent of movement of the boom in either direction from either side of the crane frame. Contactor 265 controls the connections of the motor shunt field 266 which is in parallel with a resistor 267, both the shunt field and its resistor being in series with a parallel circuit containing the contactor 265 and a resistor 268. The shunt field excitation may thus be weakened to assist friction brake 79 upon excitation of its coil 242 following closing of the contactor 244.

In the boom racking circuit both emergency stop switches and limit switches are provided for controlling motor movement. Because the boom is extensible both to port and to starboard of the crane frame, each control station is provided with two pairs of emergency switches for severally controlling boom movements in the two directions from either station. Thus the port control station has two control switches 273 and 275 for controlling forward movement of the boom and two control switches 274 and 276 for controlling reverse movement of the boom, the switches being utilized dependent on the boom position relative to the frame and accordingly being dependent on the degree of rotation of the motor shaft and the position of the limit switches. The starboard control station also has two forward switches 277 and 279 and two reverse switches 278 and 280. The limit switches have contacts 285 and 286 for controlling outward and inward movement respectively of the boom relative to the frame on the port side thereof and contacts 287 and 288 respectively controlling outward and inward movement of the boom on the starboard side of the frame.

The haulage motor and its major circuit portions are shown in Fig. 16, the motor armature, the series field and the commutating field all being designated 100. The motor armature and commutating field are connected across two branches of a parallel circuit with the branches severally including contactors 295, 296 and 297, 298 which circuits may be completed for obtaining movement of the crane in either direction in the passage from the port and the starboard control stations respectively. A contactor 301 and a resistor 302 control the dynamic braking connections between the two branches of the above parallel circuits and a contactor 305 and a resistor 306 are connected in parallel with the above parallel circuit. Friction brake operation and shunt field weakening are obtained respectively by operating contactor 244 as described in connection with Fig. 14 and by operating contactor 265 as described in connection with Fig. 15. The haulage motor circuit is also provided with emergency switches 247, 248 in the several control stations for interrupting the motor circuit whenever desired.

When not in use the crane will generally be located as nearly on the longitudinal center line of the ship as possible and the boom will be extended to overhang equally from the two ends of the crane frame. When the crane is to be used to shift cargo between the decks only, the ports remain closed but the crane frame and the boom are movable within given limits. Hence, either of the controlling stations may be used and the crane or boom may be positioned to bring pulley 136 or 137 in the desired position in hatches 21 whereby cargo may be shifted between the decks at any time and to any extent desired up to the hoisting limit imposed by limit switches 165, 166.

When cargo is to be loaded into the ship, the operator occupies the control station nearest the side of the ship at which loading is to be done and the port of the passage is opened. Controller 187 is then operated to energize motor 56 which moves the crane as a whole as closely adjacent to the port as is permitted by the crane travel limit switch 66, 67. The boom 93, 94 may be racked outwardly while the crane is moving, by use of the switch 189, and beyond the side of the ship to bring the pallet 139 over the location at which it is to be loaded. The controller 188 is then moved to energize motor 146 in the direction to unwind cables 131 sufficiently to lower the pallet to rest on the pier. When the pallet is loaded, controller 188 is reversed to wind up the cables and such winding up continues automatically until stopped by the limit switch 165, 166. Hence, the operator can employ part of the hoisting time in racking the boom toward the ship and, as soon as the pallet clears the port, can reverse controller 187 to energize motor 56 for return movement of the crane through the passage. Retraction of the boom can continue during the return movement of the crane in the passage because such retracting movement is limited by switches 260, 261 and 262, 263. Thus the boom may be fully retracted while the crane is moving in the return direction and requires a minimum return movement of the crane to bring the pallet over the hatches. When the pallet clears the hatches, controller 188 is reversed to lower the pallet to the desired between-decks space and the boom may be again shifted to bring the pallet closely adjacent the deck where the pallet and its load may be removed by other means. Unloading operations are the reverse of those above described and need not be described.

It will thus be seen that the present invention provides a crane wholly contained within a ship and available for shifting cargo at any time or for loading and unloading cargo immediately upon coming into port. Only a single operator is required to control all crane movements and two or more of the three crane movements may be performed simultaneously dependent on the position of the crane parts and the skill of the operator, and interlocking switches are provided to prevent faulty operation of the crane thus minimizing the operating skill required. The entire combination includes a minimum of parts which are rugged and have been proved practical in other severe usages. Only three power drives are required and are made so simple and similar to other known drives and to each other that the minimum skill is required in maintaining the crane in the best operating condition and that only a minimum of spare parts need be carried on the ship.

I claim:

1. In a ship's cargo handling crane movable in an athwart passage in the ship's hull, rails fixed in and extending through the passage, a frame, wheels mounted on the frame for rolling on the rails and under a portion thereof for supporting and retaining the frame against movement transversely of the rails, means on the frame for positively moving the frame along the rails, a boom mounted on the frame for reciprocation relative thereto, the boom being extensible from and retractible into the ship's hull, and means mounted on the boom and movable relative thereto for raising and lowering a load.

2. In a crane movable in a transverse passage in a ship with ports in the ship's hull at the ends of the passage, a pair of rails fixed in and extending through the passage, a rack fixed in the passage, a crane frame, wheels mounted on the frame for movement on the rails, a boom mounted on the frame for extension through the ports, means mounted on the frame for engagement with said rack for driving the frame along the rails, and means mounted on the boom for hoisting and lowering loads suspended therefrom.

3. In a crane movable in a transverse passage in a ship with ports in the ship's hull at the ends of the passage, a pair of rails fixed in and extending through the passage, a rack fixed in said passage, a crane frame, wheels mounted on the frame for movement on and engagement with the rails, the rails having flanges engageable by some of the wheels to retain the crane in position on the rails, a boom mounted on the frame for extension through the ports, means mounted on the frame for engagement with the rack for driving the frame and the boom along said rails, and means mounted on the boom for hoisting and lowering loads suspended therefrom.

4. In a ship's cargo handling crane movable in an athwart passage in the ship's hull, rails fixed in and extending throughout the passage, the rails having racks formed thereon and flanges extending therefrom, a frame, wheels mounted on the frame for rolling on the rails and under the flanges thereof for supporting and retaining the frame against movement transversely of the rails, a plurality of pinions on the frame and severally engaging the racks on the rails for positively moving the frame along the rails, a single power drive on the frame for rotating the pinions, a boom mounted on the frame for reciprocation relative thereto, the boom being extensible from and retractible into the ship's hull, and means mounted on the boom and movable relative thereto for raising and lowering a load.

5. In a crane movable in a transverse passage in a ship with ports in the hull thereof at the ends of the passage, a pair of rails fixed in and extending through the passage, a crane frame, wheels mounted on the frame for movement on the rails, a plurality of separate boom members severally mounted on the frame along the frame sides for reciprocation relative thereto, means mounted on the frame for reciprocating the boom members relative to the frame simultaneously and by the same amount, and means mounted on the boom members for hoisting and lowering loads suspended therefrom.

6. In a ship's cargo handling crane movable in an athwart passage in the ship's hull, rails fixed in and extending throughout the passage, a frame including a plurality of pillars along two sides thereof and pairs of flanged rollers mounted on each of the pillars in similarly spaced vertical alinement, wheels mounted on the frame for retaining the frame in predetermined positions upon movement along the rails, means mounted on the frame for positively moving the frame along the rails, a boom comprising separate members severally mounted between the pair of rollers on the pillars along the sides of the frame for reciprocation relative thereto, the boom members being extensible from and retractible into the ship's hull, and means mounted on the boom members and movable relative thereto for raising and lowering a load.

7. In a crane movable longitudinally in a transverse passage in a ship with ports in the hull thereof at the ends of the passage, a pair of rails fixed in and extending through the passage, a crane frame, wheels mounted on the frame for movement on the rails, a plurality of separate boom members severally mounted on the frame along the frame sides for movement relative thereto, racks severally mounted on the boom members, pinions severally engaging the boom racks, a common drive for the rack pinions, and means mounted on the boom members for hoisting and lowering loads suspended therefrom.

8. In a crane movable in a transverse passage in a ship with ports in the ship's hull at the ends of the passage, a pair of rails fixed in and extending through the passage, a crane comprising a frame and a plurality of boom members mounted on the frame for reciprocation relative thereto, means for moving the crane longitudinally in the passage, means for moving the boom members relative to the frame, a set of sheaves mounted on each of the boom members, a cable reeved on each of the sets of sheaves, and means for winding up and paying out the cables simultaneously and by the same amount to hoist and lower a load supported jointly by the cables.

9. In a crane movable in a transverse passage in a ship with ports in the hull at the ends of the passage, a plurality of rails fixed in and extending throughout the passage, a crane frame, wheels mounted on the frame for movement on the rails, electrical motor driven means on the frame for positively moving the frame along the rails, a boom mounted on the frame for reciprocation relative thereto, electrical motor driven means for reciprocating the boom relative to the frame, cable means mounted on the boom for raising and lowering a load, electrical motor driven means on the frame for winding up and paying out the cable means, and duplicate control stations on the frame and at the ends thereof for controlling all of the motors from either of the stations, the several control stations being interconnected for operation of each of the motor means from either of the stations.

10. A cargo handling device for a ship having an athwart passage between decks, parellel rails fixed in the passage, a frame having wheels mounted thereon for engagement with said rails, drive means for moving the frame along the rails and carried by said frame, parallel booms reciprocally mounted on said frame parallel to said rails, drive means for simultaneously moving said booms relative to said frame, cargo supporting means carried by each boom and movable relative thereto for hoisting and lowering cargo, drive means mounted on said frame for simultaneously moving each of said cargo supporting means in the same direction and through the same distance so a load may be supported by and between the cargo supporting means.

11. A cargo handling device for operation in an athwartship passage having a port providing access to the exterior of the ship, parallel rails fixed in the passage, a frame having wheels mounted thereon for rolling engagement with said rails, means mounted on said frame for positively driving said frame along said rails, a pair of parallel booms reciprocally mounted on said frame parallel to said rails and in the upper corners of said passage for projection through said port, means for synchronously moving said booms relative to said frame, cable means reeved on each boom, a cargo block at an end of each boom and reeved on the cable means, said blocks being adjacent each other, means for taking in or paying out said cable means to synchronously raise or lower said blocks so a load may be carried by and between said blocks and may project upward between said booms to take full advantage of the athwartship passage headroom.

12. A cargo handling device for operating in an athwartship passageway having a port at each end, parallel rails fixed in the passage, a frame having wheels mounted thereon for rolling engagement with said rails, means mounted on said frame for positively driving said frame along said rails, a pair of parallel booms reciprocally mounted on said frame parallel to said rails and in the upper corners of said passage for projection through said port, means for synchronously moving said booms relative to said frame, cable means reeved on each boom, a cargo block at each end of each boom and reeved on said cable means, means for taking in or paying out said cable means to synchronously raise or lower said blocks, the blocks at adjacent ends of the parallel booms being adapted for synhronous operation as a pair, means for selectively limiting block movement to one of the pairs when the cable means is taken in or paid out, each of said pairs being adapted to support a load between the blocks so the load may project upward between said booms to take full advantage of the passageway headroom.

JAMES W. SPEER.

REFERENCES CITED

The following references are of record in the file of this patent:

UNITED STATES PATENTS

| Number | Name | Date |
| --- | --- | --- |
| 853,842 | Titcomb | May 14, 1907 |
| 1,292,097 | Schweinert | Jan. 21, 1919 |
| 1,367,907 | Andrews | Feb. 8, 1921 |
| 1,703,153 | Knoll | Feb. 26, 1929 |
| 2,351,478 | Boyle | June 13, 1944 |
| 2,456,104 | Anderson | Dec. 14, 1948 |